United States Patent
Cavazos

(10) Patent No.: US 12,032,784 B2
(45) Date of Patent: Jul. 9, 2024

(54) METHODS AND APPARATUS FOR ALTERNATIVE INPUT OR ALTERNATIVE FEEDBACK

(71) Applicant: Lancer Corporation, San Antonio, TX (US)

(72) Inventor: Joshua Anthony Cavazos, San Antonio, TX (US)

(73) Assignee: Lancer Corporation, San Antonio, TX (US)

( * ) Notice: Subject to any disclaimer, the term of this patent is extended or adjusted under 35 U.S.C. 154(b) by 0 days.

(21) Appl. No.: 18/138,422

(22) Filed: Apr. 24, 2023

(65) Prior Publication Data

US 2023/0350521 A1  Nov. 2, 2023

Related U.S. Application Data

(60) Provisional application No. 63/336,871, filed on Apr. 29, 2022.

(51) Int. Cl.
| | |
|---|---|
| *G06F 3/0488* | (2022.01) |
| *G06F 3/01* | (2006.01) |
| *G06F 3/02* | (2006.01) |
| *G06F 3/041* | (2006.01) |
| *G06F 3/0485* | (2022.01) |
| *G06F 3/16* | (2006.01) |

(52) U.S. Cl.
CPC ............ *G06F 3/0418* (2013.01); *G06F 3/017* (2013.01); *G06F 3/0202* (2013.01); *G06F 3/0485* (2013.01); *G06F 3/0488* (2013.01); *G06F 3/167* (2013.01)

(58) Field of Classification Search
CPC ...... G06F 3/017; G06F 3/0202; G06F 3/0418; G06F 3/0485; G06F 3/0488; G06F 3/167
See application file for complete search history.

(56) References Cited

U.S. PATENT DOCUMENTS

| | | | |
|---|---|---|---|
| 2016/0085376 A1* | 3/2016 | Mabie | G06F 3/0482 345/178 |
| 2020/0247661 A1 | 8/2020 | Rao et al. | |
| 2023/0257253 A1* | 8/2023 | Lange | G05B 19/41875 700/283 |

FOREIGN PATENT DOCUMENTS

| | | | | |
|---|---|---|---|---|
| WO | WO-2022037533 A1 * | 2/2022 | .......... | G06F 11/0751 |

OTHER PUBLICATIONS

PCT/US2023/019647. International Search Report, Written Opinion of the ISA, and the examiner's search strategy and results.

\* cited by examiner

*Primary Examiner* — Michael Pervan

(57) ABSTRACT

A beverage dispenser and method are provided in which, upon failure of the primary user input device (30), an alternative user input device and/or alternative feedback device is activated to receive beverage selections and/or provide feedback.

20 Claims, 11 Drawing Sheets

METHODS AND APPARATUS FOR ALTERNATIVE INPUT OR ALTERNATIVE FEEDBACK

TECHNICAL FIELD OF THE INVENTION

This invention relates generally to dispensers and dispensing methods, and more particularly to methods and apparatus for alternative user input or alternative feedback.

BACKGROUND OF THE INVENTION

Many beverage dispensers use a touchscreen as a user interface. A user may make a beverage selection via the touchscreen, and the screen often provides a visual confirmation of the selected beverage. Dispensing of the selected beverage may be facilitated via the touchscreen, or with separate devices, such as, for example, a "pour" button, or a lever switch against which a cup is pressed.

SUMMARY OF THE INVENTION

In accordance with the teachings of the present invention, a method of operating a beverage dispenser is provided that comprises receiving beverage selection input at a primary user input device, detecting that the primary user input device has failed, activating an alternative user input device, and receiving beverage selection input at the alternative user input device after it has been activated.

In some embodiments, activating an alternative user input device comprises adding functionality to an adjunct device. In some embodiments, the adjunct device is a touchscreen, and adding functionality comprises enabling the touchscreen to present beverage choices and to receive beverage selections from among the beverage choices. Adding functionality may further comprise enabling scrolling on the touchscreen to access beverage choices. In some embodiments, the beverage choices are determined by drink analytics, machine learning, pattern recognition, daypart algorithms, or limited time offering preferences. Adding functionality may also comprise adding a pour button to a touch screen.

Also, in some embodiments, adding functionality to a touchscreen may comprise enabling the touchscreen to present a single beverage choice. Furthermore, the single beverage choice may be determined by a method selected from the group consisting of drink analytics, machine learning, pattern recognition, daypart algorithms, and limited time offering preferences.

In other embodiments, the adjunct device is an accessibility keypad having buttons, and adding functionality comprises assigning beverage selections to one or more of the buttons.

In other embodiments, the primary user input device is a device for receiving input to pour a beverage (such as, without limitation, a pour button or pour lever), and activating an alternative user input device comprises reconfiguring a touchscreen to include a pour button.

In other embodiments, the alternative user input device is a microphone, and receiving beverage selection input at the alternative user input device comprises receiving voice instructions. In other embodiments, the alternative user input device is a camera, and receiving beverage selection input at the alternative user input device comprises receiving gesture instructions. In still other embodiments, the alternative user input device is a smart device. In other embodiments, the alternative user input device is a projector and a camera, and further comprises projecting beverage choices using the projector and receiving beverage selection input at the alternative user input device comprises receiving at the camera user interaction with the projected beverage choices.

The method may also include activating an alternative feedback device.

In some embodiments, detecting that the primary user input device has failed comprises sensing that the primary user input device is not drawing an expected amount of power. In other embodiments, wherein the primary user input device comprises a screen, detecting that the primary user input device has failed comprises sensing that the screen is not displaying information properly. In other embodiments wherein the primary user input device comprises a touchscreen, detecting that the primary user input device has failed comprises sensing that touch inputs to the touchscreen are not being properly registered. In other embodiments, detecting that the primary user input device has failed comprises observing a failure of the primary user input device, and further comprises registering the failure detection with the dispenser.

In some embodiments, beverage selection input is received at at least two touchscreens, and detecting that the primary user input device has failed comprises detecting that one of the touchscreens has failed, and wherein activating an alternative user input device comprises reconfiguring one of the other at least two touchscreens to perform tasks of the failed touchscreen.

Also provided is a method of operating a beverage dispenser that comprises providing user feedback from a primary feedback device, detecting that the primary feedback device has failed, activating an alternative feedback device, and providing user feedback from the alternative feedback device after it has been activated. In some embodiments, activating an alternative feedback device comprises adding functionality to an adjunct device.

Important technical advantages are provided by the present invention. In particular, and without limitation, by providing alternative user input devices and/or alternative feedback devices, a beverage dispenser may still be used even if a primary user input device and/or primary feedback device fails.

BRIEF DESCRIPTION OF THE DRAWINGS

Reference is made in the description to the following briefly described drawings, which are not drawn to scale, and in which like reference numerals indicate like features.

DETAILED DESCRIPTION OF THE INVENTION

Although this invention is particularly suited for beverage dispensing, and will be discussed in connection with beverage dispensing embodiments, it may be implemented on any dispenser, including, without limitation, automatic teller machines, vending machines, ticket dispensers, and token dispensers.

Figure 1:
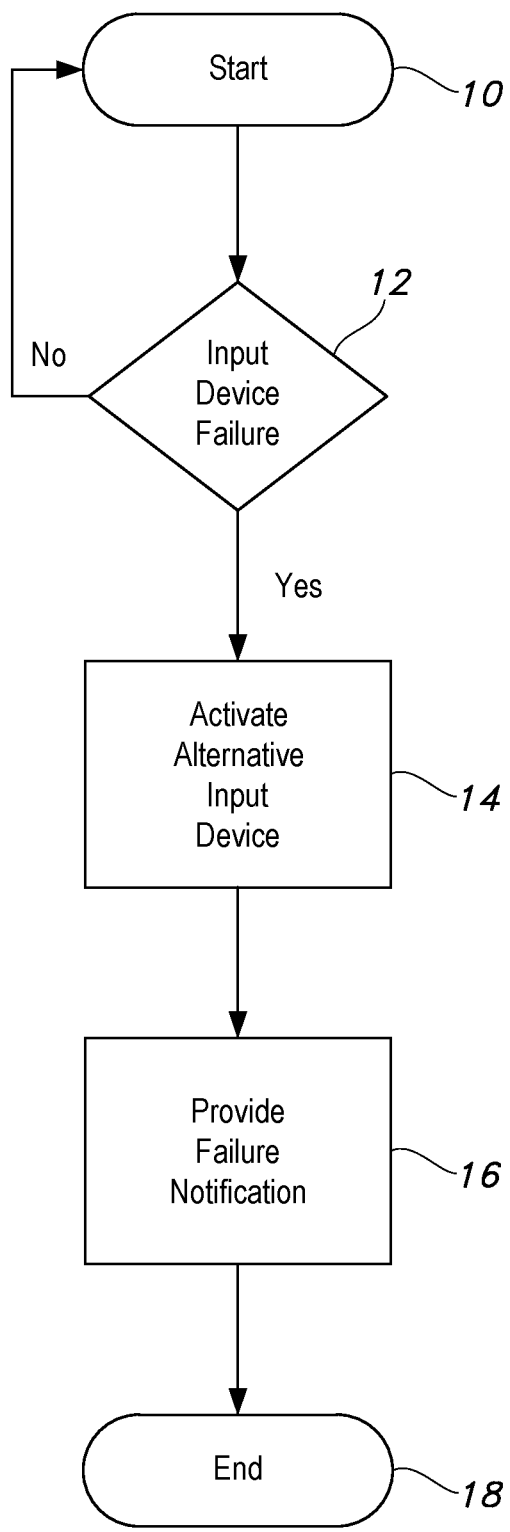
FIG. 1 is a flow chart of a method according to certain aspects of the present invention.

FIG. 1 is a flow chart of one embodiment of a method for operating a dispenser according to the teachings of the present invention. The method starts at start node 10, and proceeds to decision block 12. At decision block 12, it is determined whether a primary user input device (or method) of the dispenser has failed. The primary user input device may be any device or system used to receive input from a user, for example, and without limitation, a touchscreen. If it has not failed, then the method loops back to start node 10. If the primary user input device has failed, then the method proceeds to block 14, wherein an alternative (or secondary) user input device is activated. At block 16, notification of the failure may be provided in any suitable way, for example, and without limitation, via cloud service, the internet, email, text, indicator lights, and displayed messages. The method may end at end node 18. When the failure of the primary user input device is addressed (for example, and without limitation, by rebooting, recalibrating, fixing software, repair or replacement), the method starts over at start node 10.

The method may also be implemented in a continuous loop, wherein flags or other settings are used to indicate certain conditions. For example, and without limitation, a flag can be used to indicate that failure of the primary user input device has already been detected, that an alternative user input device has already been activated, or that failure notice has already been provided, thus avoiding unnecessary re-detection, re-activation or re-notification, respectively. The method can loop continuously, with changes occurring when the flags are reset.

Figure 2:
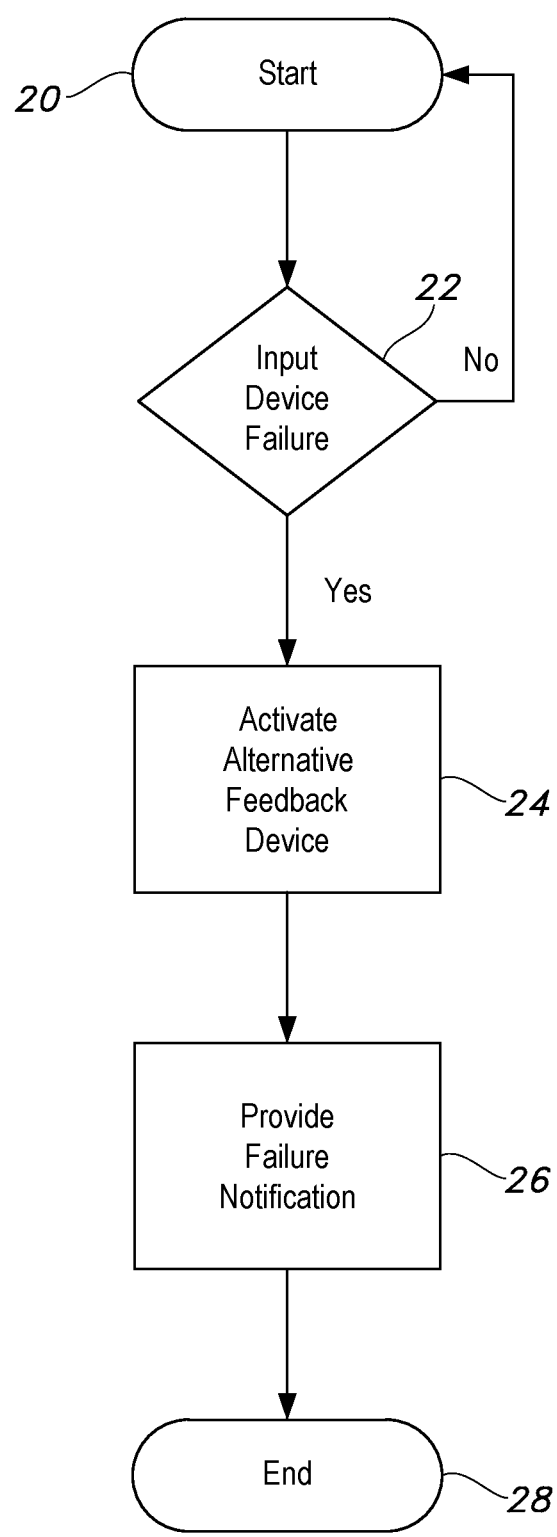
FIG. 2 is a flow chart of a method according to certain aspects of the present invention.

FIG. 2 is a flow chart of another embodiment of a method for operating a dispenser according to the teachings of the present invention. The method of FIG. 2 relates to failure of a feedback device (i.e., one that provides feedback to the user related to the user's selections or other input, such as, without limitation, haptic feedback, highlights, graphics, and audio). The primary feedback device may be the primary user input device, a separate device, or any combination thereof. The method starts at start node 20, and proceeds to decision block 22. At decision block 22, it is determined whether a primary feedback device (or method) of the dispenser has failed. If it has not failed, then the method loops back to start node 20. If the primary feedback device has failed, then the method proceeds to block 24, wherein an alternative (or secondary) feedback device is activated. At block 26, notification of the failure may be provided in any suitable way, for example, and without limitation, via cloud service, the internet, email, text, indicator lights, and displayed messages. The method may end at end node 28. When the failure of the primary user input device is addressed (for example, and without limitation, by rebooting, recalibrating, fixing software, repair or replacement), the method starts over at start node 20.

The method of described in FIG. 2 may also be implemented in a continuous loop, wherein flags or other settings are used to indicate certain conditions. For example, and without limitation, a flag can be used to indicate that failure of the primary feedback device has already been detected, that an alternative feedback device has already been activated, or that failure notice has already been provided, thus avoiding unnecessary re-detection, re-activation or re-notification, respectively. The method can loop continuously, with changes occurring when the flags are reset.

The methods of the present invention may be carried out in any suitable way with any suitable devices, for example, and without limitation, by using an electronic controller to process instructions and control various devices.

Failure of the primary user input device, or of the primary feedback device, may be detected in any suitable way. Following are non-limiting examples of failure detection. In one example, failure may be observed by a person, and that failure detection may then be registered with the dispenser in any suitable way, including, without limitation, through a non-user interface, by using remote access to register the failure detection, or by using a bypass switch to bypass the primary user input device. As another example, failure can be detected automatically. For example, failure may be detected by sensing that the device is not drawing an expected amount power (for example, without limitation, by sensing current levels), or that a touchscreen is not displaying information properly (for example, and without limitation, as indicated by an improper video handshake protocol), or that touch inputs to a touchscreen are not being properly registered. Furthermore, automatic failure detection may be a feature that is enabled or disabled. Also, automatic failure detection may itself be monitored, manually or automatically, to determine if it is operating properly, and if not, information may be provided to facilitate repair (for example, and without limitation, via email, an error file, or an error message).

With the present invention, activation of the alternative user input device, and/or the alternative feedback device, allows continued use of the beverage dispenser even if a primary user input device (and/or feedback device) fails.

The alternative (or secondary) user input device (and/or feedback device) may be a device that is already in use with the dispenser, but which, upon activation, gains more or different functionality. Such devices, which in normal operations are used with the dispenser, are referred to herein as adjunct devices. Or, the alternative (or secondary) user input device (and/or feedback device) may be a device that is only operated when the primary user input device fails.

As used herein, the primary user input device (or method) is a designation for any device (or method) for receiving user input. For example, and without limitation, if a dispenser includes two user input devices, either may be designated primary, and the other will then be considered alternative (or secondary) and, in this example, also adjunct. For example, and without limitation, the primary user input device (or method) may be the main, or most prominent, device (or method) for receiving user input or for receiving some kinds of user input, it may be one of two or more devices (or methods) equally used for receiving user input, or it may be one of two or more user input devices (or methods) and used less prominently than the other(s).

Following are several examples of particular embodiments of the present invention.

For clarity, beverage selection input includes any input related to any aspect of selecting or pouring a beverage, for example, and without limitation, choosing from among brands, among flavors, among drink sizes, and among ice options, and requesting that the beverage be poured (such as, without limitation, by pressing a pour button or lever).

Figure 3:
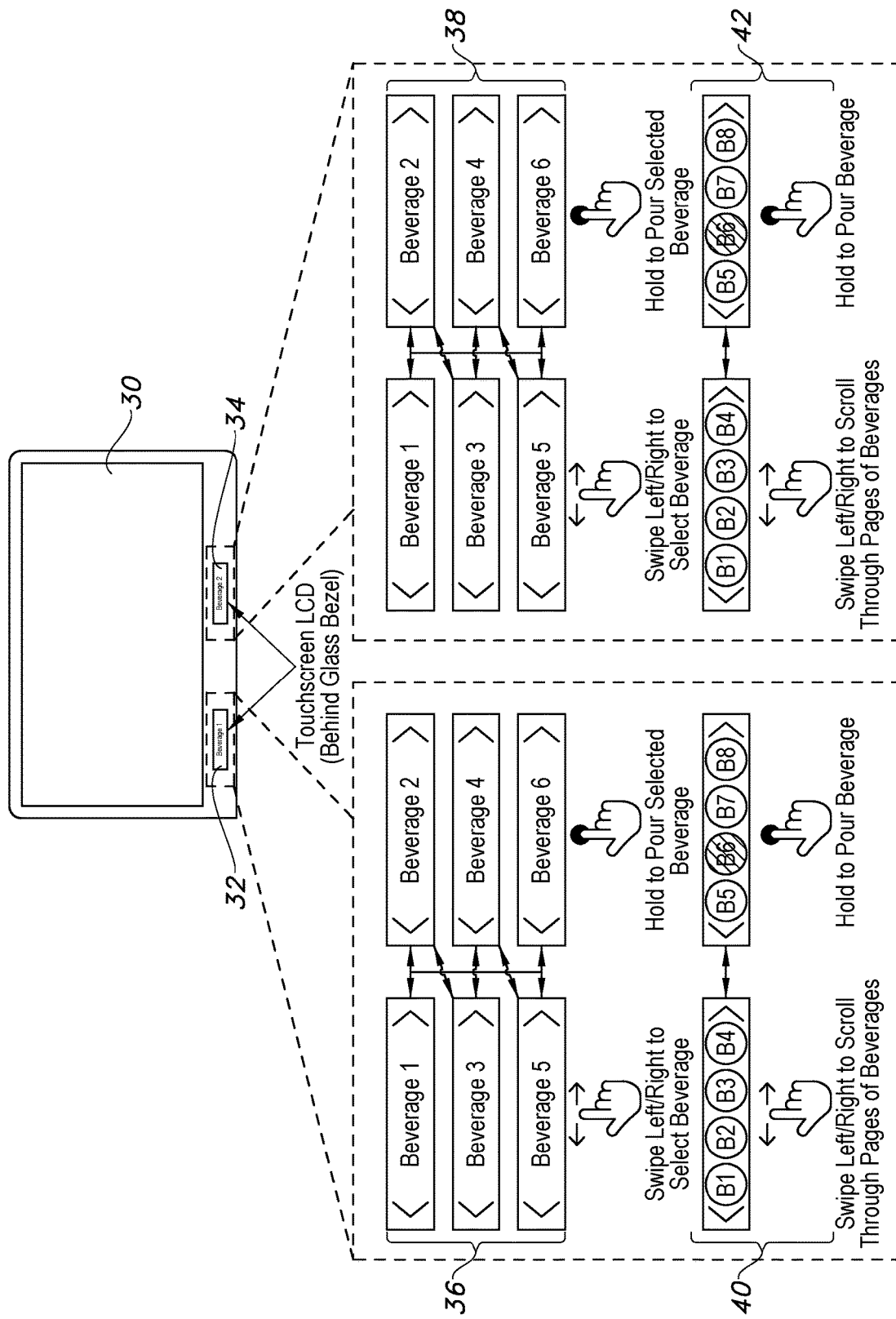
FIG. 3 illustrates one embodiment of a secondary input device according to certain aspects of the present invention.

FIG. 3 shows one particular embodiment of the present invention, in which a dispenser includes a touchscreen user interface 30. During normal operation of this particular embodiment, a user interacts with touchscreen interface 30 to make beverage selections, and then dispenses the selected beverage by pressing a pour button (32 or 34). Although two pour buttons 32 and 34 are shown, only one, or more than two, may be used.

Each pour button 32 and 34 may be a separate touchscreen, or any suitable input device, and will generally be smaller than the primary user input device (but need not be smaller). During normal operation, after beverage selection, one of the pour buttons 32 or 34 lights up, or otherwise indicates to the user that the selected beverage can be dispensed by pressing the indicated pour button. Each pour button may correspond with a particular nozzle through which one or more beverages are dispensed.

Upon detection of a failure of user interface 30, pour buttons 32 and 34, which are adjunct devices, are activated to allow users to interact with them not just to dispense beverages, but also to make beverage selections. FIG. 3 shows two particular approaches that can be used to allow such beverage selections. In one approach, illustrated by references 36 and 38, each adjunct device is enabled to display a beverage choice (for example, and without limitation, by showing the name or brand logo of the beverage), and the user may select that first displayed choice, or use a gesture, such as a swipe or scroll gesture (left or right, up or down, for example) to change the beverage choice. Once the desired beverage choice is displayed, the user may select and dispense the beverage by pressing and holding the displayed choice. Any suitable approach may be used to change the beverage choice or to select and dispense the beverage.

In the second illustrated approach, shown by references 40 and 42, each adjunct device 32 or 34 is enabled to show more than one beverage choice, such as, for example, by displaying a plurality of brand logos of certain beverage choices. A user may select one of the displayed beverage choices, or use a gesture, such as a swipe or scroll gesture to scroll to other beverage choices. Once the desired beverage choice is displayed, the user may select and dispense the beverage by pressing and holding the indicator for that choice. Any suitable approach may be used to change the beverage choice or to select and dispense the beverage.

Also, if either of the user input devices (pour buttons) 32 or 34 fails, user interface 30 may be activated to include the functionality of the failed pour button (for example, and without limitation, user interface 30 may display a pour button close to the failed pour button which, when touched, results in dispensing of a selected beverage). In this example, the failed pour button would be the primary user input device, and user interface 30 would be the alternative (or secondary) user input device and, in this example, also an adjunct device.

In some embodiments, user input may be received through two or more touchscreens, for example, with one touchscreen used primarily for certain beverages choices, and the others for other groups of beverage choices. In one example having two such touchscreens, one touchscreen may be used to select beverages dispensed though one multi-flavor dispensing nozzle, and the other may be used to select beverages dispensed through a second multi-flavor dispensing nozzle. Upon detection of a failure of one of these touchscreens (which would now be referred to as a primary user input device), the other touchscreen, which would be referred to as an adjunct device, may be reconfigured to perform its tasks of selection and any tasks of the failed touchscreen. In particular, it would be reconfigured to allow selection of all the brands that may be dispensed through either multi-flavor nozzle. In this way, all the beverage choices would still be available for selection.

Figure 4:
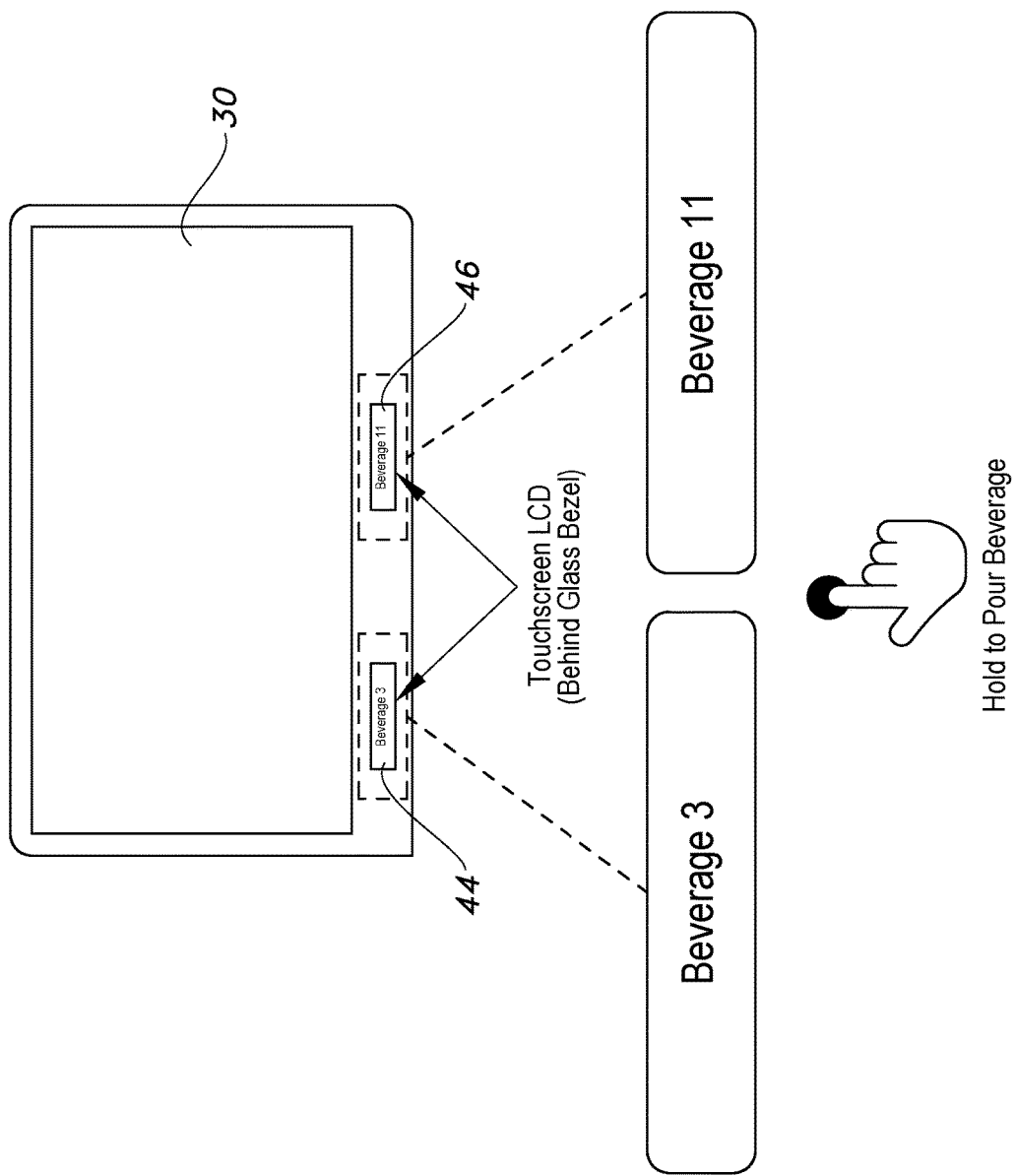
FIG. 4 illustrates another embodiment of a secondary input device according to certain aspects of the present invention.

FIG. 4 is similar to the example of FIG. 3, except that, upon detection of a failure of primary user input device 30, adjunct devices 44 and 46 are configured to display one brand each, or similar to the presentation shown in connection with references 40 and 42 of FIG. 3, a plurality of brands. In this example, however, the adjunct devices are not provided with the functionality to allow customers to scroll to beverage choices other than the one or more displayed on the adjunct devices. The beverage of choice may be dispensed by pressing and holding the adjunct device, or, in the case of multiple displayed beverages, pressing and holding the graphical indication of the chosen beverage.

Also, as discussed above, if either of the devices 44 or 46 fails, user interface 30 may be activated to include the functionality of the failed device (for example, and without limitation, user interface 30 may display a pour button close to the failed pour button which, when touched, results in dispensing of a selected beverage). In this example, the failed device 44 or 46 would be the primary user input device, and user interface 30 would be the alternative (or secondary) user input device and, in this example, also an adjunct device.

Various approaches may be used to choose which beverage choice or choices to present on or in conjunction with the alternative user input devices, or to present first in cases where scrolling to other choices is provided. For example, and without limitation, such choice or choices may be pre-defined by the operator of the dispenser, or assigned programmatically by using drink analytics, machine learning, pattern recognition, daypart algorithms, or limited time offering preferences, among other approaches. In addition, each alternative user input device may operate independently and change in real-time to a user operating the other one—for example, and without limitation, if the two alternative user input devices show the top two brands, the one showing the second brand may be configured to change to show the top brand while the other is being used.

Figure 5B:
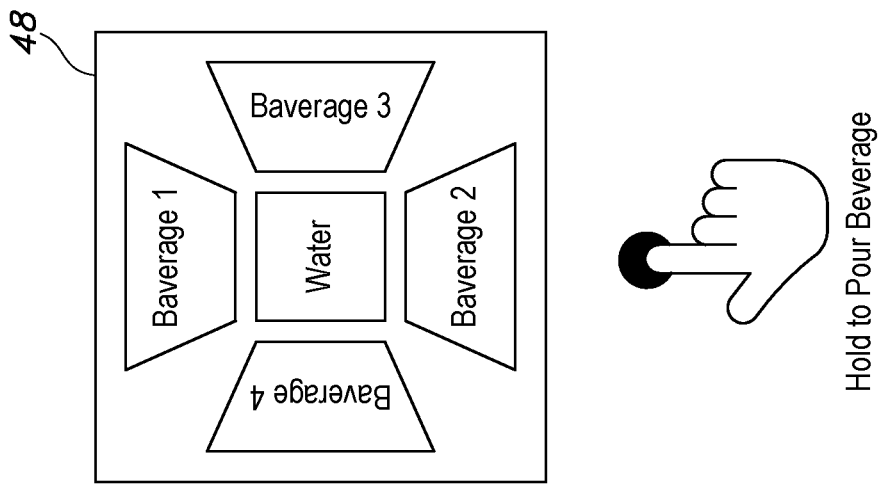
FIGS. 5a and 5b illustrate another embodiment of a secondary input device according to certain aspects of the present invention.
Figure 5A:
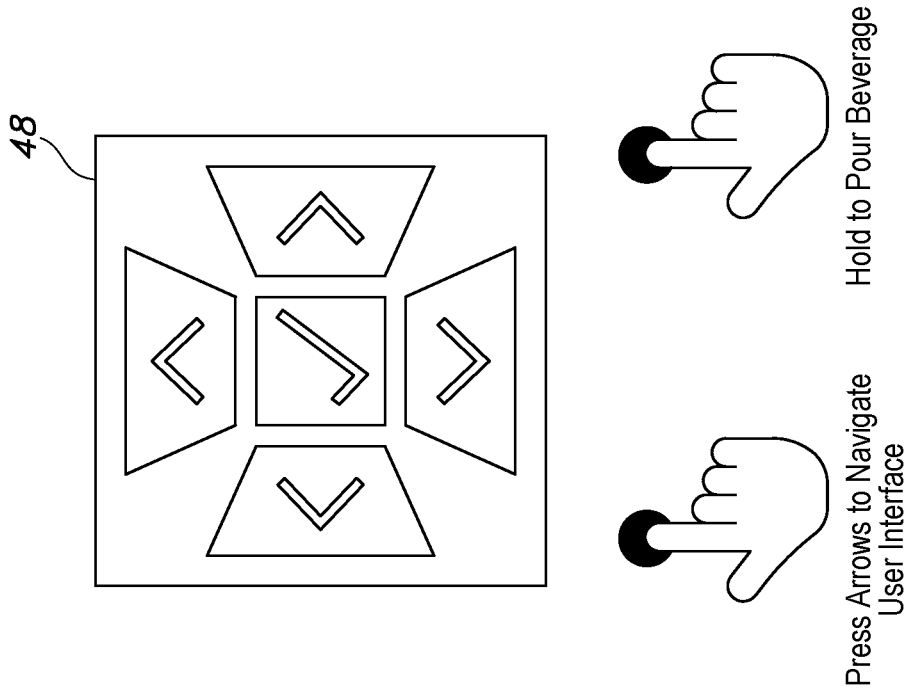

FIGS. 5a and 5b show an input device 48 known as an accessibility keypad, which is sometimes used with dispensers to allow input for users who experience challenges in accessing the primary user input device. FIG. 5a shows its normal operation, in which arrow buttons are used to navigate within the primary user input device, and a check button is used to make selections. In one embodiment of the present invention, upon detection of a failure of the primary user interface, one or more of these buttons are reconfigured and assigned to particular beverage choices. As shown in the example of FIG. 5b, the arrow and check buttons are assigned to particular beverage choices, such that pressing and holding one of the buttons dispenses the corresponding beverage. In the example of FIG. 5b, the check button is assigned to water, and the arrow buttons are assigned to beverages 1, 2, 3, and 4. The choice of which beverages to assign to each button may be made in any suitable way, including, without limitation, as discussed above (e.g., predefined by the operator of the dispenser, or assigned programmatically, among other approaches). The assignment may be communicated to the user in any suitable way, including, without limitation, by providing a printed guide that shows which beverages are assigned to which button, or by the use of stickers or other graphical overlays to place on the buttons.

Figure 6:
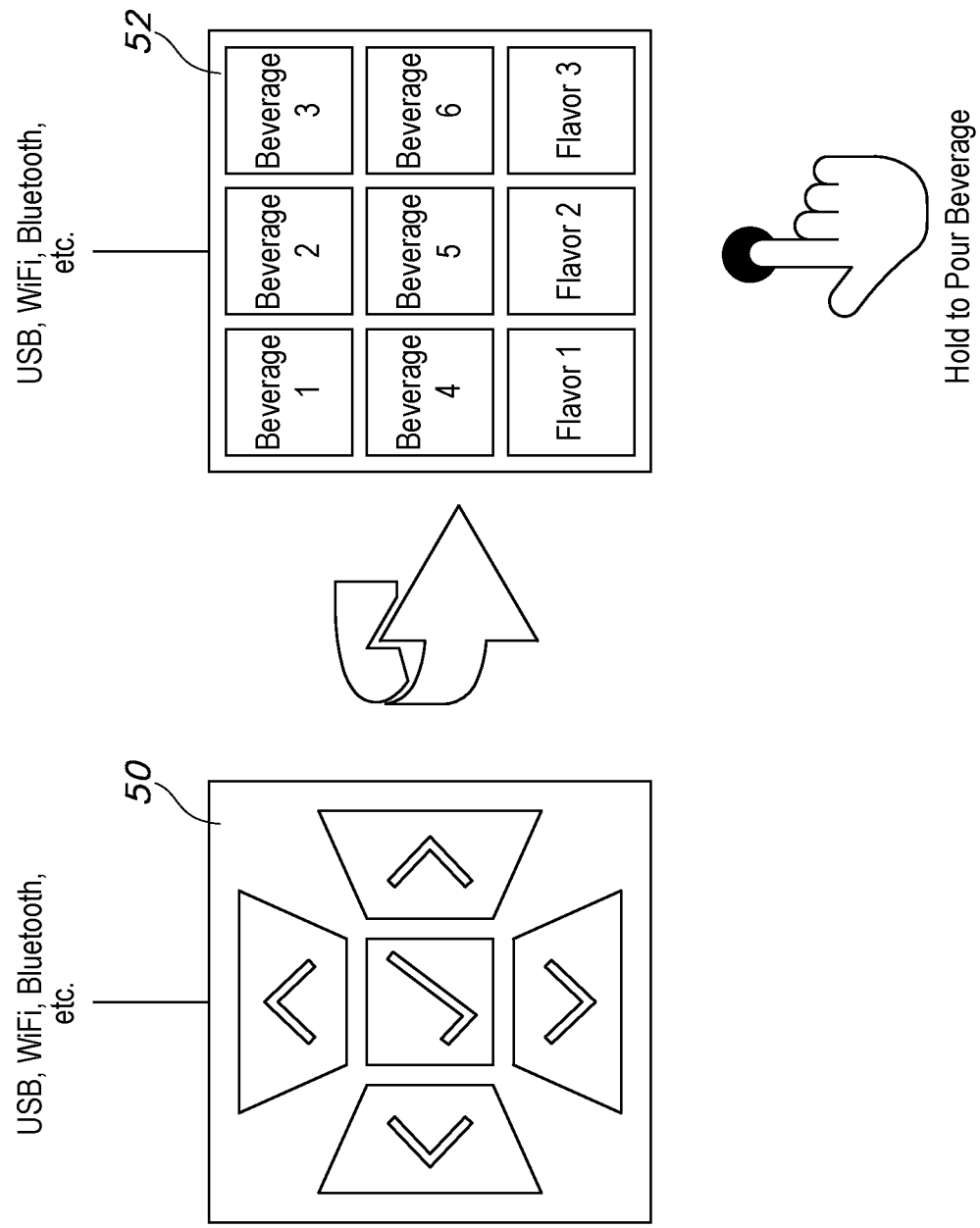
FIG. 6 illustrates another embodiment of a secondary input device according to certain aspects of the present invention.

FIG. 6 shows the front 50 (arrow and check buttons) and the back 52 (rectangular array of buttons) of a typical accessibility keypad. In another embodiment of the present invention, upon detection of a primary user input device failure, one or more of the buttons on the back 52 may be assigned to particular beverage choices, using any suitable approach. In the example shown, the buttons on back 52 are assigned to beverages 1 through 6, and flavors 1 through 3. The assignment may be communicated to users in any suitable way.

Figure 7:
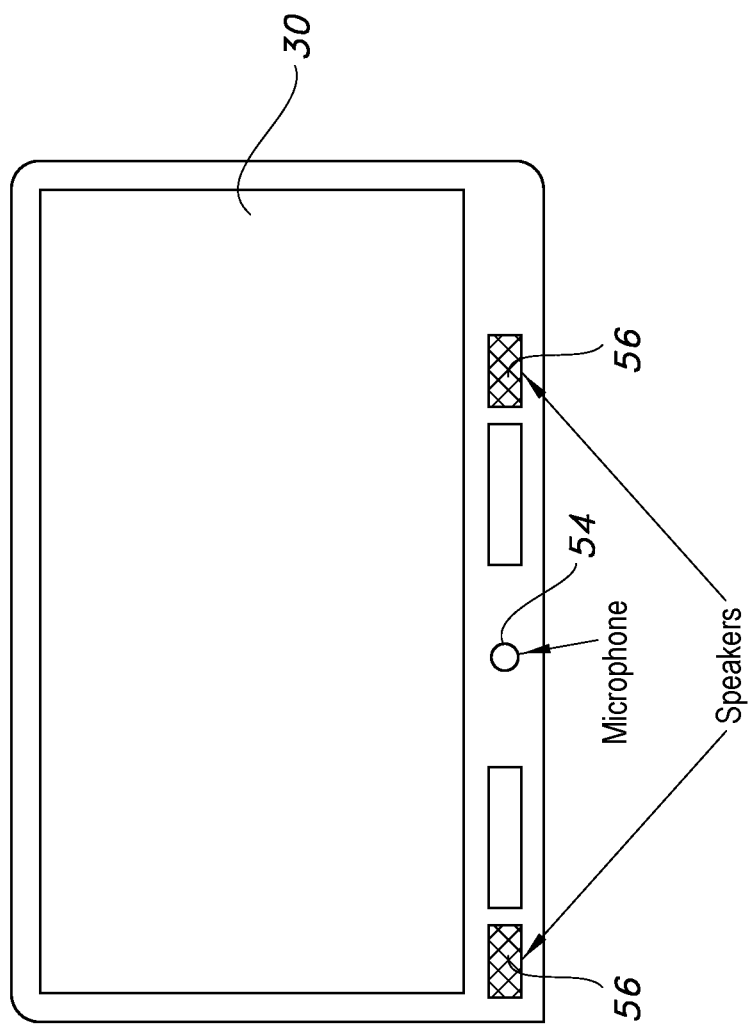
FIG. 7 illustrates another embodiment of a secondary input device according to certain aspects of the present invention.

FIG. 7 illustrates another embodiment, in which a microphone 54 and one or more speakers 56 are provided. In this embodiment, upon detection of failure of primary user input device 30, the microphone 54 may be used to receive speech for voice control of the dispenser. Speakers 56 may be used to provide feedback to the user.

Figure 8:
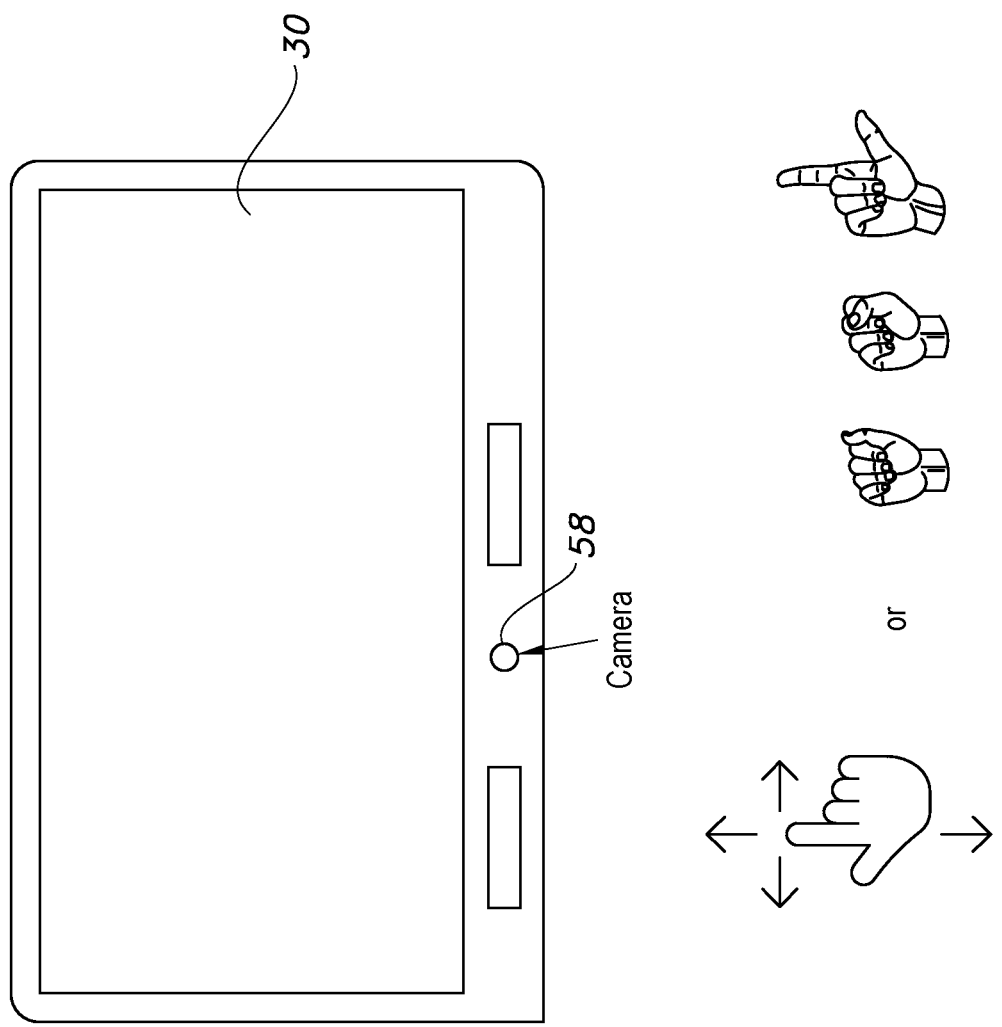
FIG. 8 illustrates another embodiment of a secondary input device according to certain aspects of the present invention.

FIG. 8 illustrates another embodiment of the present invention in which a camera 58 is provided. In this embodiment, upon detection of primary user input device failure, the camera 58 is used to receive gesture information to control the dispenser. For example, the gestures may be akin to sign language, with certain gestures representing particular beverages, selection, and pouring, for example. This embodiment may be combined with audio feedback, to allow confirmation of the user's choices.

Figure 9:
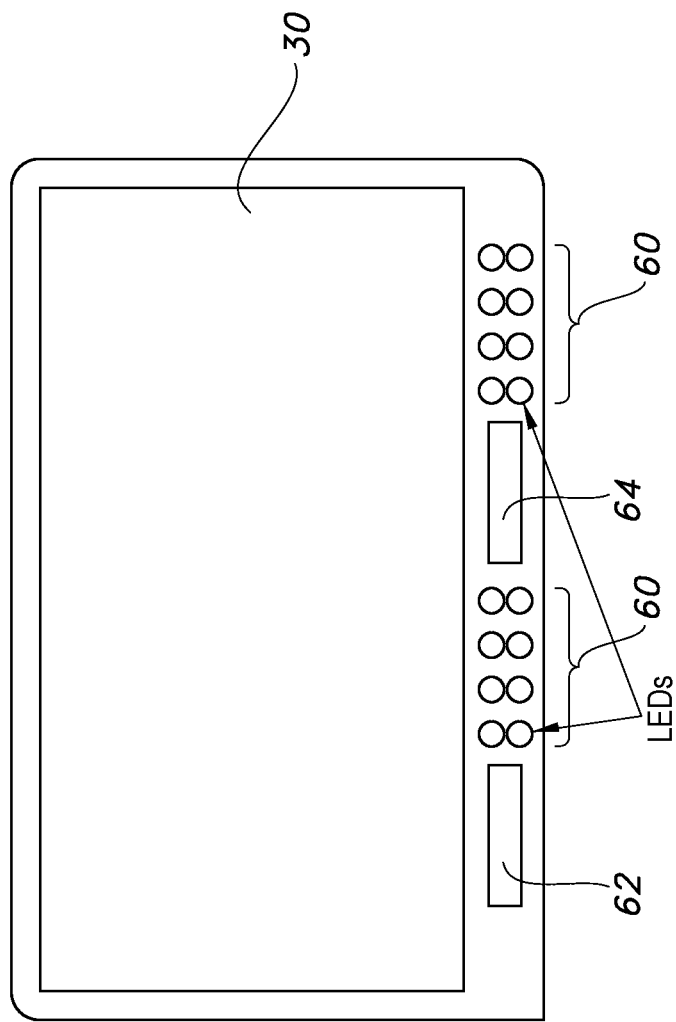
FIG. 9 illustrates another embodiment of a secondary input device and alternate feedback approach according to certain aspects of the present invention.

FIG. 9 shows an embodiment wherein a plurality of LEDs 60 are used to provide feedback to a user. In particular, upon detection of a failure of the primary user input device, individual LEDs light up pre-printed beverage indicators (or transparent stickers) to indicate a user's choice. This feedback may be, although need not be, used in connection with adjunct devices 62 and 64 (such as, without limitation, those discussed above in connection with FIGS. 3 and 4). Also, with this embodiment, capacitive touch sensors (or other input devices) may be used with each LED such that, upon detection of a failure of the primary user input device, each LED lights up to show the available choices, and a user selects and pours a beverage by pressing and holding the sensor associated with the LED-lit indicator.

Figure 10:
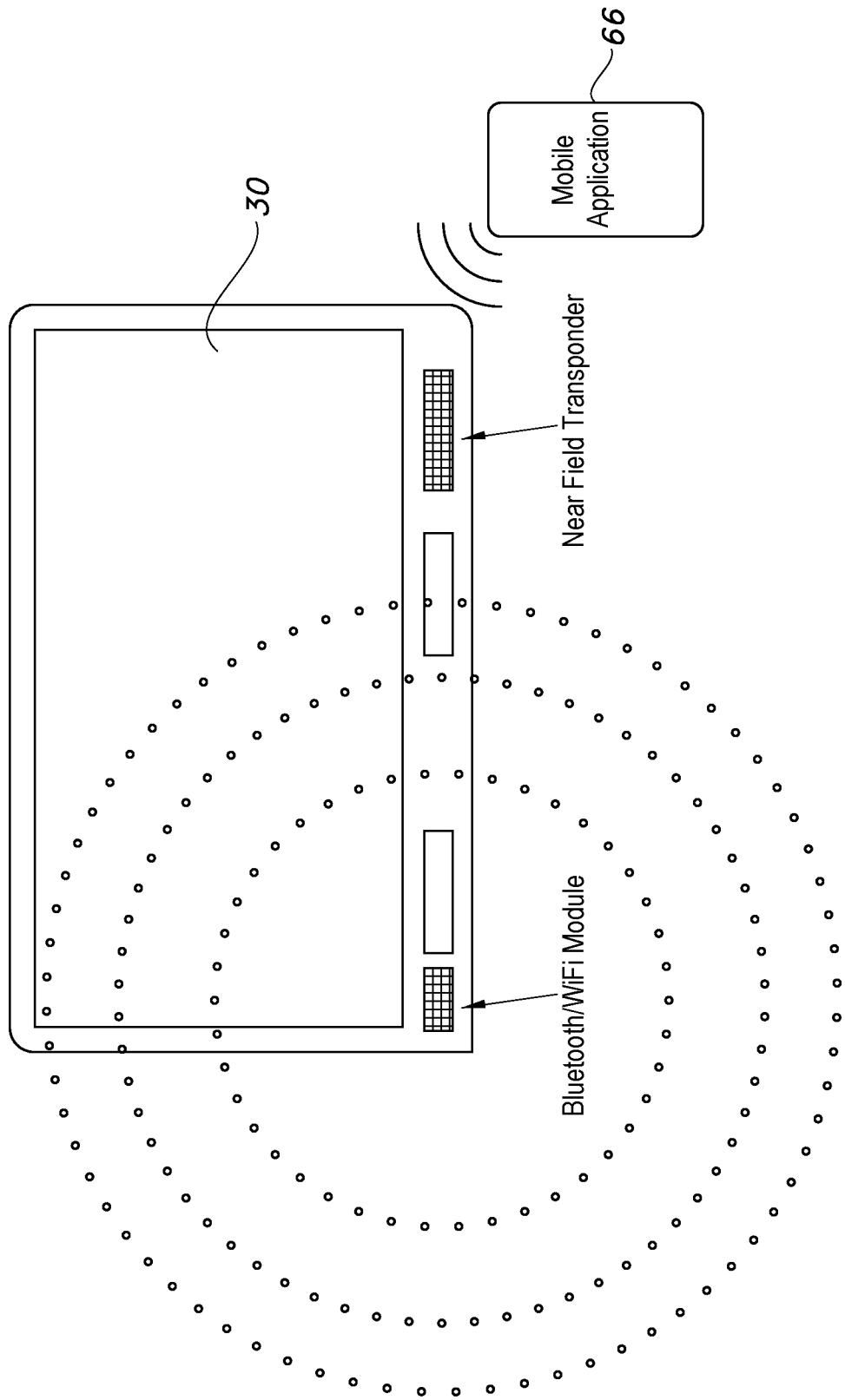
FIG. 10 illustrates another embodiment of a secondary input device according to certain aspects of the present invention.

FIG. 10 illustrates another embodiment, wherein, upon detection of a failure of primary user input device 30, a user may use a smart phone (or other device, such as, without limitation, a tablet or computer) 66 to communicate with the dispenser for selection and dispensing of beverages. With this option, an individual user may use a personal device to interact with the dispenser, or the owner/operator of the dispenser may connect a device with a screen (such as a tablet or computer) for all users to use. Any such connected device is referred to as a smart device. An application may be made available to device 66 for such control, and communication with the dispenser may be accomplished in any suitable way, including, without limitation, by Bluetooth, WiFi, near-field communication, or web-based connection.

Figure 11:
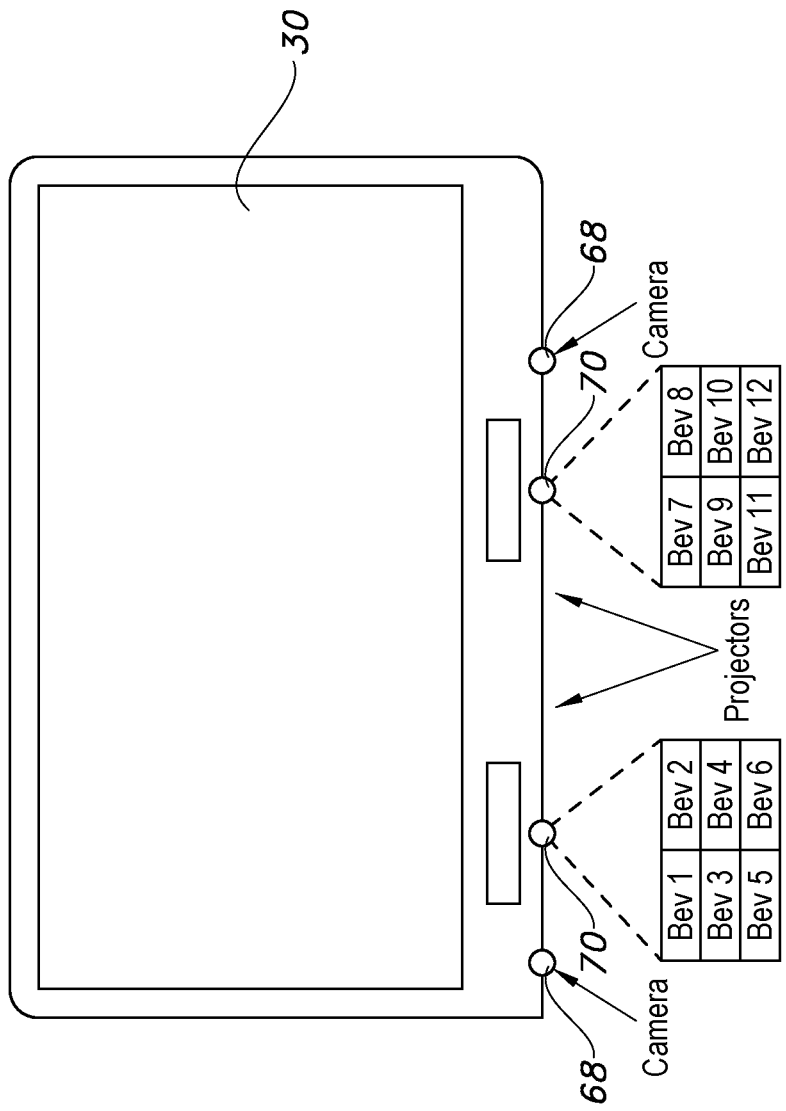
FIG. 11 illustrates another embodiment of a secondary input device according to certain aspects of the present invention.

FIG. 11 shows another embodiment, in which one or more cameras 68 and one or more projectors 70 are used to allow selection and dispensing of beverages upon detection of a failure of primary user input device 30. In this embodiment, beverage choices are projected in any suitable way by projector 70, and camera 68 is used to receive a user's interaction with the projection to determine the user's choice and desire to dispense. Feedback may be used to confirm the user's choices.

Particular features of the example embodiments may be used with, added to, or substituted in the other example embodiments.

Although the present invention has been described in detail, it should be understood that various changes, alterations, substitutions, additions, and modifications could be made without departing from the intended scope of the invention, as defined in the following claims. In particular, although specific examples of alternative user input and feedback have been provided, other methods and devices may be used without departing from the intended scope of the present invention.

What is claimed is:

1. A method of operating a beverage dispenser, comprising:
   receiving beverage selection input at a primary user input device;
   detecting that the primary user input device has failed;
   in response to detecting that the primary user input device has failed, activating an alternative user input device; and
   receiving beverage selection input at the alternative user input device after it has been activated.

2. The method of claim 1, wherein activating an alternative user input device comprises adding functionality to an adjunct device.

3. The method of claim 2, wherein the adjunct device is a touchscreen, and adding functionality comprises enabling the touchscreen to present beverage choices and to receive beverage selections from among the beverage choices.

4. The method of claim 3, wherein adding functionality further comprises enabling scrolling on the touchscreen to access beverage choices.

5. The method of claim 3, wherein the beverage choices are determined by a method selected from the group consisting of drink analytics, machine learning, pattern recognition, daypart algorithms, and limited time offering preferences.

6. The method of claim 2, wherein the adjunct device is touchscreen, and adding functionality comprises enabling the touchscreen to present a single beverage choice.

7. The method of claim 2, wherein the adjunct device is an accessibility keypad having buttons, and adding functionality comprises assigning beverage selections to one or more of the buttons.

8. The method of claim 1, wherein the primary user input device is a device for receiving input to pour a beverage, and wherein activating an alternative user input device comprises reconfiguring a touchscreen to include a pour button.

9. The method of claim 1, wherein the alternative user input device is a microphone, and wherein receiving beverage selection input at the alternative user input device comprises receiving voice instructions.

10. The method of claim 1, wherein the alternative user input device is a camera, and wherein receiving beverage selection input at the alternative user input device comprises receiving gesture instructions.

11. The method of claim 1, wherein the alternative user input device is a smart device.

12. The method of claim 1, wherein the alternative user input device is a projector and a camera, and further comprising projecting beverage choices using the projector, and wherein receiving beverage selection input at the alternative user input device comprises receiving at the camera user interaction with the projected beverage choices.

13. The method of claim 1, and further comprising activating an alternative feedback device in response to detecting that the primary user input device has failed.

14. The method of claim 1, wherein detecting that the primary user input device has failed comprises sensing that the primary user input device is not drawing an expected amount of power.

15. The method of claim 1, wherein the primary user input device comprises a screen, and wherein detecting that the primary user input device has failed comprises sensing that the screen is not displaying information properly.

16. The method of claim 1, wherein the primary user input device comprises a touchscreen, and wherein detecting that the primary user input device has failed comprises sensing that touch inputs to the touchscreen are not being properly registered.

17. The method of claim 1, wherein detecting that the primary user input device has failed comprises observing a failure of the primary user input device, and further comprising registering the failure detection with the dispenser.

18. The method of claim 1, wherein beverage selection input is received at at least two touchscreens, and wherein detecting that the primary user input device has failed comprises detecting that one of the touchscreens has failed, and wherein activating an alternative user input device comprises reconfiguring one of the other at least two touchscreens to perform tasks of the failed touchscreen.

19. A method of operating a beverage dispenser, comprising:
   providing user feedback from a primary feedback device;
   detecting that the primary feedback device has failed;
   in response to detecting that the primary feedback device has failed, activating an alternative feedback device; and
   providing user feedback from the alternative feedback device after it has been activated.

20. The method of claim 19, wherein activating an alternative feedback device comprises adding functionality to an adjunct device.

* * * * *